Dec. 16, 1969          A. A. WAGNER ET AL          3,484,830
                          PIPE COUPLING
                       Filed Dec. 5, 1967
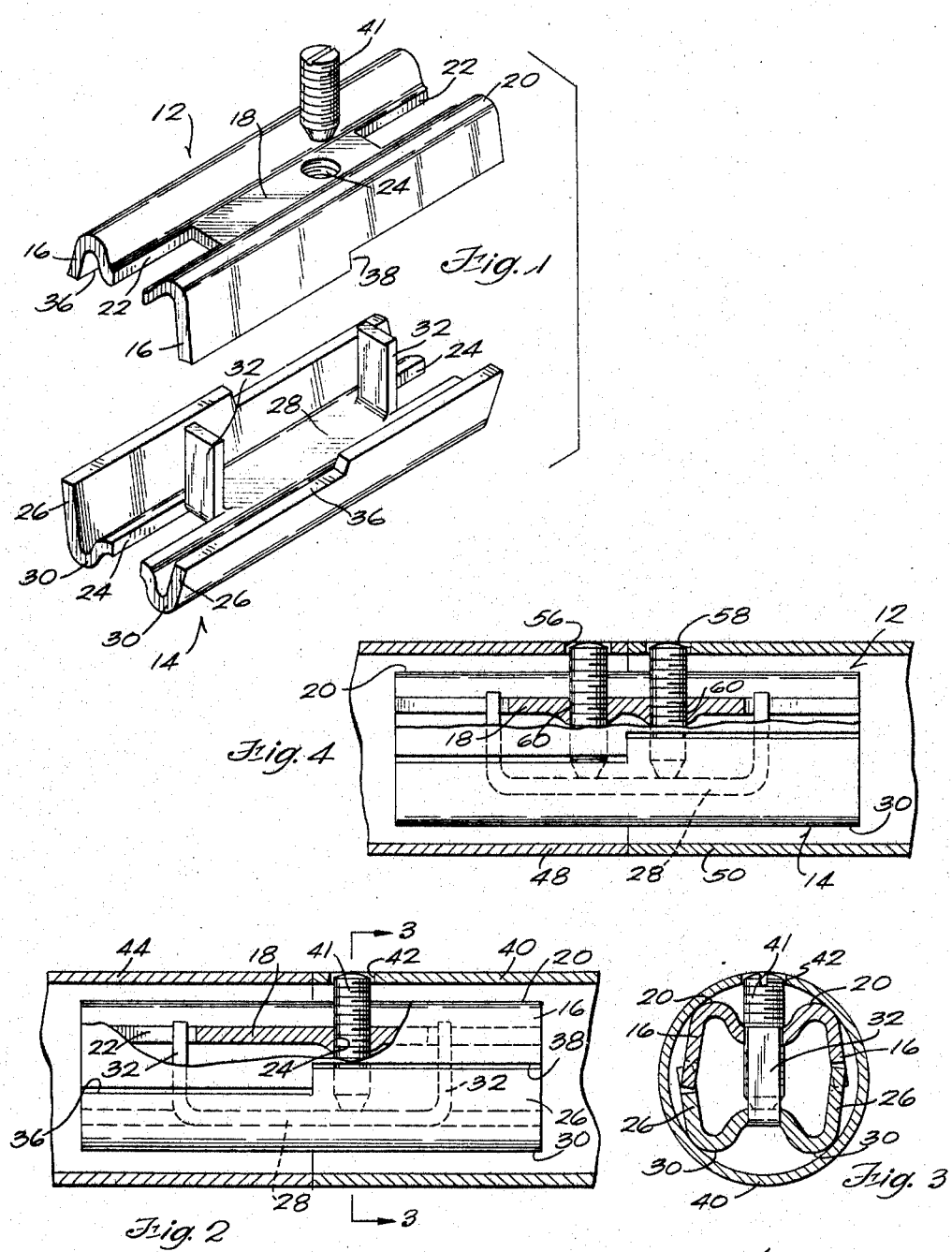
Inventors
Adolph A. Wagner
Robert A. Wagner
By Wheeler, Wheeler, House & Clemency
Attorneys United States Patent Office 3,484,830
Patented Dec. 16, 1969

3,484,830
PIPE COUPLING
Adolph A. Wagner, 3454 N. Shepard Ave., Milwaukee, Wis. 53211, and Robert A. Wagner, 2301 W. Kenboern Drive, Glendale, Wis. 53209
Filed Dec. 5, 1967, Ser. No. 688,198
Int. Cl. F16l 25/00, 19/00
U.S. Cl. 285—397          6 Claims

ABSTRACT OF THE DISCLOSURE

Disclosed herein is a pipe coupling device having a pair of channel sections each of which has side wall flanges formed for mating engagement and a pair of prongs in one channel section extending into a pair of corresponding slots in the other channel section and at least one screw for expanding the channel sections after insertion into the ends of two abutting pipes.

Background of the invention

In U.S. Patent No. 2,850,304, issued Sept. 2, 1958, a pipe coupling or splice lock is disclosed which is inserted into the ends of a pair of abutting pipes and expanded by a screw to lock the abutting pipe ends together. The sidewall flanges of the channel sections were provided with an interlocking notch along their edges to prevent longitundinal movement between the sections, however, no provision was made to prevent lateral displacement or sideways movement between the sections. This meant that the sections had to be held in the assembled relationship or the sections could shift relative to each other.

Summary of the present invention

In U.S. Patent No. 2,850,304, issued Sept. 2, 1958, a is disclosed which has a pair of channel sections that can be preassembled and an interlocking arrangement provided between the channel sections prevents any lateral or longitudinal displacement between the sections. In preferred embodiments the interlocking arrangement comprises tongue-in-slot portions of the splice lock. With this arrangement, the coupling device can be preassembled for storage or shipment by merely taping or tying the sections together. When the preassembled coupling device is used, it is partially inserted into the end of a pipe and it will remain in the assembled relation either by the snug fit with the pipe or by leaving the tape on the assembled sections. The end of a second pipe is slipped over the exposed portion of the device and moved into abutting relation with the end of the first pipe. The sections are so interlocked that they cannot shift after assembly and can be expanded after the pipes have been moved into engagement to lock the abutting pipes together.

Other objects and advantages will become apparent from the following description when read in connection with the accompanying drawings in which:

FIG. 1 is an exploded perspective view of the pipe coupling device.

FIG. 2 is a section of a pipe railing with the pipe coupling device positioned within the ends of a pipe railing.

FIG. 3 is a section taken on line 3—3 of FIG. 2.

FIG. 4 is a longitudinal cross section taken through a modified embodiment of splice lock, installed in abutting pipe sections.

Description of preferred embodiments

Although the disclosure hereof is detailed and exact to enable those skilled in the art to practice the invention, the physical embodiment herein disclosed merely exemplify the invention which may be embodied in other specific structure. The scope of the invention is defined in the claims appended hereto.

Referring more particularly to FIG. 1 of the drawing, the pipe coupling device includes an upper channel section 12 and a lower channel section 14. Upper and lower, as used in the description, merely refer to their arrangement in the drawings, and it should be understood that the coupling can be placed into a pipe railing in any angular position.

The upper channel section has a pair of side wall flanges 16 connected by a center web 18 with the side wall flanges 16 reversely bent to form ribbed margins or shoulders 20. A slot or groove 22 is provided in each end of the center web 18 and a threaded aperture 24 is provided closer to one end of the channel than to its other end. The respective groove 22 extends longitudinally of the web and run out its respective ends.

The lower channel section 14 has a pair of side wall flanges 26 connected by a center web 28 with the side wall flanges 26 reversely bent to form ribs of shoulders 30. The center web 28 is cut and bent upward at each end to form tongues or prongs 32 which have a width slightly smaller than the width of the slots 22. The distance between the prongs 32 is made slightly longer than the distance between the ends of the slots 22.

The upper and lower channel sections 12 and 14 are assembled by aligning the sections on their longitudinal axes and inserting the tongues or prongs 32 into the slots 22 until the edges of the side walls are in abutting engagement. After the sections have been assembled, a tape or like binder can be used to hold them together during storage and shipment. The engagement of tongues or prongs 32 with grooves or slots 22 forms an interlocking means between the channel sections that will prevent lateral displacement of the channel sections.

The edges of the side wall flanges 16 and 26 on the upper and lower channel sections are shown with oppositely disposed notches or cutouts 36 and 38, respectively, which are identically cut to operatively engage on assembly of the upper and lower channel sections. The engagement of the notches aids in preventing longitudinal movement between the sections.

When the pipe coupling device is to be used, the assembled channel sections are inserted into the end of a pipe 40 (FIG. 2). A screw means such as an Allen head screw 41 is inserted through an aperture 42 provided in the pipe 40 and screwed into the threaded aperture 24 in the center web 18 of the upper channel section 12. The screw 41 is turned far enough to engage the center web 28 of the lower channel member. The end of the other pipe 44 is placed over the pipe coupling device and pushed forward into engagement with the end of the pipe 40. The screw is then tightened to apply pressure to the center web 28 and expand the sections seating the ribs 20 and 30 tightly against the inner walls of the pipes 40 and 44. The joint between the pipes 40 and 44 may then be welded. The pipe coupling device may be used in round or square pipes so long as the outer dimensions of the device are sufficient to engage the inside surfaces of the pipes when expanded.

Although the tongue and groove means for interlocking the channel sections has been shown and described as a pair of tongues and a corresponding pair of grooves, other alternate arrangements can be used to accomplish this result. A tongue and groove can be provided in each web to engage a corresponding tongue and groove in the other web or a single tongue in one web and a single closed ended slot in the other web could also be used to interlock the channel sections.

In the embodiment of FIG. 2 only a single screw 41 was used to seat the device in the pipes 40 and 44. The end of that part of the splice lock in pipe 44 is seated in the pipe 44 by the force applied by screw 41 in pipe 40. If the inside diameter of the pipe 40 is larger than the pipe 44, the end of the device in pipe 40 would not seat tightly in the pipe.

In FIG. 4 a modified pipe coupling or splice lock is shown positioned within the ends of pipes 48 and 50. This pipe coupling includes an upper channel section 12 and a lower channel section 14 having side wall flanges and center webs as described and numbered above. The center web 18 of the upper channel section 12 has two threaded apertures 60 which are aligned with apertures 56 and 58 in pipes 48 and 50, respectively. Two screws 52 are inserted into the apertures 56 and 58 and screwed into the threaded apertures 60 until they engage the center web 28 on the lower channel section. Each of the screws 52 will assure a tight fit in the end of each of the pipes 48 and 50.

What is claimed is:

1. A pipe coupling for splicing two pipes in abutting engagement, said coupling comprising
   a pair of channel sections, each having a pair of side walls reversely bent upon a connecting web,
   a web of one section having a groove extending longitudinally of the web,
   a web of the other section having a tongue slidably engaged in said groove and laterally interlocking said sections,
   and screw means threaded in one of the center webs for engagement with the other center web to expand the channel sections upon insertion into the ends of a pair of pipes.

2. A pipe coupling according to claim 1 in which the web of one of said sections has a second groove extending longitudinally thereof, the web of the other section having a second tongue slidably engaged in said second groove.

3. A pipe coupling according to claim 2 wherein both tongues are in one channel section and both grooves are in the other channel section.

4. A pipe coupling according to claim 3 wherein said grooves run out the ends of their channel sections and said tongues comprise cut and bent portions of the web of their channel sections.

5. A pipe coupling according to claim 1 wherein said screw means includes
   two screws in the center web of one of said sections, one of said screws being located to expand the channel sections in each of said pipes.

6. A pipe coupling for splicing two pipes in abutting engagement, said coupling comprising
   a first section and a second section, each of said sections having a pair of sidewalls bent from a connecting web and being large enough to engage the inside surfaces of said pipe when assembled,
   a pair of grooves extending longitudinally in the connecting web of said first section and running out of the ends thereof,
   a pair of tongues bent out of the connecting web of said second section,
   said tongues being slidably engaged in said grooves and laterally interlocking said sections when the sections are assembled,
   and screw means for separating said sections after insertion in the pipes.

References Cited

UNITED STATES PATENTS

| 1,860,866 | 5/1932 | Marshall | 287—126 |
| 2,290,430 | 7/1942 | Heiser | 287—126 |
| 2,850,304 | 9/1958 | Wagner | 285—397 |
| 2,952,484 | 9/1960 | Zoltok. | |

FOREIGN PATENTS

| 744,284 | 2/1956 | Great Britain. |
| 421,871 | 1/1935 | Great Britain. |
| 1,191,182 | 4/1965 | Germany. |
| 609,993 | 5/1958 | Italy. |

DAVID J. WILLIAMOWSKY, Primary Examiner

WAYNE L. SHEDD, Assistant Examiner

U.S. Cl. X.R.
287—111, 118, 126

PO-1050
(5/69)

UNITED STATES PATENT OFFICE
CERTIFICATE OF CORRECTION

Patent No. 3,484,830      Dated December 16, 1969

Inventor(s) A. A. Wagner et al

It is certified that error appears in the above-identified patent and that said Letters Patent are hereby corrected as shown below:

Column 1, Line 36,    DELETE "In U.S. ----a" and INSERT
---In the present invention a pipe coupling or splice lock---

Column 1, Line 72,    "embodiment" should read ---embodiments---

Column 2, Line 17,    "groove" should read ---grooves---

Column 2, Line 17,    "extends" should be ---extend---

Column 2, Line 46,    DELETE "an"

SIGNED AND SEALED
APR 28 1970

(SEAL)
Attest:
Edward M. Fletcher, Jr.
Attesting Officer

WILLIAM E. SCHUYLER, JR.
Commissioner of Patents